US012576932B2

(12) United States Patent
Yamada

(10) Patent No.: US 12,576,932 B2
(45) Date of Patent: Mar. 17, 2026

(54) REAR CARRIER FOR SADDLED VEHICLE

(71) Applicant: Honda Motor Co., Ltd., Tokyo (JP)

(72) Inventor: Tsuyoshi Yamada, Tokyo (JP)

(73) Assignee: HONDA MOTOR CO, LTD., Tokyo (JP)

( * ) Notice: Subject to any disclaimer, the term of this patent is extended or adjusted under 35 U.S.C. 154(b) by 450 days.

(21) Appl. No.: 18/121,776

(22) Filed: Mar. 15, 2023

(65) Prior Publication Data

US 2023/0312036 A1     Oct. 5, 2023

(30) Foreign Application Priority Data

Mar. 29, 2022     (JP) ................................. 2022-053554

(51) Int. Cl.
B62J 7/04          (2006.01)
(52) U.S. Cl.
CPC ...................................... B62J 7/04 (2013.01)
(58) Field of Classification Search
CPC .................. B62J 7/02; B62J 7/04; B62J 9/23
USPC ........................................................ 280/202
See application file for complete search history.

(56) References Cited

U.S. PATENT DOCUMENTS

| | | | | | |
|---|---|---|---|---|---|
| 4,269,335 | A | * | 5/1981 | LaRose | ...................... B62J 1/28 224/450 |
| 7,011,240 | B2 | * | 3/2006 | Kan | ........................... B62J 7/04 224/427 |
| 8,757,713 | B2 | * | 6/2014 | Reinhardt | ................ B60N 2/04 297/215.12 |
| 2018/0327041 | A1 | * | 11/2018 | Moroni | ...................... B62J 9/24 |

FOREIGN PATENT DOCUMENTS

| | | |
|---|---|---|
| JP | 2008-68653 A | 3/2008 |
| JP | 2014-213733 A | 11/2014 |
| WO | WO 2017/203544 A1 | 11/2017 |

OTHER PUBLICATIONS

Japanese Office Action for Japanese Application No. 2022-053554, dated Jan. 9, 2024, with English translation.
German Office Action for German Application No. 10 2023 107 793.7 dated Oct. 23, 2023, with a partial English translation.

* cited by examiner

*Primary Examiner* — Valentin Neacsu
*Assistant Examiner* — Hosam Shabara
(74) *Attorney, Agent, or Firm* — Birch, Stewart, Kolasch & Birch, LLP

(57)          ABSTRACT

Provided is a rear carrier that facilitates mass concentration when a carrier member movable in a front-rear direction is moved frontward. A rear carrier for a saddled vehicle includes a swing member and a carrier member. The swing member is supported by a grab rail fixed to a rear portion of a vehicle body. The carrier member is supported by the swing member. The swing member is swingably supported on its one end side by the grab rail, and is swingably supported on its opposite side by the carrier member. Swinging of the swing member enables the carrier member to move between a front-side position and a rear-side position. When the carrier member is set at the front-side position, the carrier member is supported by a seat of the saddled vehicle.

13 Claims, 16 Drawing Sheets

UP

FRONT ← → REAR

DOWN

REAR CARRIER FOR SADDLED VEHICLE

BACKGROUND

1. Technical Field

The present invention relates to a rear carrier for a saddled vehicle. More specifically, the present invention relates to a rear carrier provided for a saddled vehicle, arranged at a rear portion of a vehicle body, and including a carrier member. The carrier member is used for placing luggage thereon.

2. Description of the Background

A rear carrier is arranged at a rear portion of a saddled vehicle, and is used for placing luggage thereon. A conventionally known structure of the rear carrier is that a position of a carrier member for placing luggage thereon is variable.

Patent Literature 1 discloses a configuration in which a rail member oriented in a front-rear direction is provided on an upper side of a rear seat of a saddled vehicle. Thereby, a carrier member can move along the rail member in the front-rear direction.

CITATION LIST

Patent Literature

Patent Literature 1: Japanese Patent Application Laid-open Publication No. 2014-213733

BRIEF SUMMARY

However, according to the configuration of Patent Literature 1, the carrier member moves in the front-rear direction at a position higher than the rear seat. Thus, there is a problem that it is difficult to concentrate a mass even in a state where the carrier member is moved frontward.

An object of the present invention is to provide a rear carrier that solves the problem in the above-described conventional technique and enables a mass to be concentrated in a state where a carrier member movable in a front-rear direction is moved frontward.

In order to accomplish the above-described object, a first feature of the present invention lies in the following in a rear carrier (30) for a saddled vehicle (1). The rear carrier (30) includes a swing member (40) and a carrier member (31). The swing member (40) is supported by a grab rail (18) fixed to a rear portion of a vehicle body. The carrier member (31) is supported by the swing member (40). The swing member (40) is swingably supported on its one end side by the grab rail (18), and is swingably supported on its opposite side by the carrier member (31). Swinging of the swing member (40) enables the carrier member (31) to move between a front-side position and a rear-side position. When the carrier member (31) is set at the front-side position, the carrier member (31) is supported by a seat (20) of the saddled vehicle (1).

A second feature lies in that a support portion (21) for supporting the carrier member (31) is provided at the seat (20).

A third feature lies in that a claw member (33) is provided at a lower portion of the carrier member (31), and when the carrier member (31) is set at the front-side position, the claw member (33) engages with a holding portion (24) provided at the seat (20).

A fourth feature lies in that an opening (23) is provided in the seat (20), the claw member (33) is inserted into the opening (23), and the holding portion (24) is provided on a lower side of the opening (23).

A fifth feature lies in that a backrest (22) is attachable to the opening (23).

A sixth feature lies in that a plate-shaped protection member (26) is provided on a lower side of the opening (23).

A seventh feature lies in the following. The rear carrier includes a first lock mechanism (A) that locks swinging motion of the swing member (40) relative to the grab rail (18). The first lock mechanism (A) includes a first fixing member (70) including a first pin (73). The first pin (73) engages with the grab rail (18), thereby locking the swinging motion. The first fixing member (70) is slidably attached to the swing member (40), and is biased toward a locking side by a first elastic member (75). The swinging motion is unlocked when the first fixing member (70) is slid in an axial direction against biasing force of the first elastic member (75). When a knob (71) of the first fixing member (70) is rotated in a state where the first fixing member (70) is slid, an axial-direction position of the first fixing member (70) is held.

An eighth feature lies in the following. The rear carrier includes a second lock mechanism (B) that locks swinging motion of the carrier member (31) relative to the swing member (40). The second lock mechanism (B) includes a second fixing member (60) including a second pin (61). The second pin (61) engages with the carrier member (31) and the swing member (40), thereby locking the swinging motion of the carrier member (31). The second fixing member (60) is slidably attached to the swing member (40), and is biased toward a locking side by a second elastic member (63). The swinging motion of the carrier member (31) is unlocked when the second fixing member (60) is slid in an axial direction against biasing force of the second elastic member (63).

According to the first feature, the rear carrier (30) for the saddled vehicle (1) is configured as follows. The rear carrier (30) includes the swing member (40) and the carrier member (31). The swing member (40) is supported by the grab rail (18) fixed to the rear portion of the vehicle body. The carrier member (31) is supported by the swing member (40). The swing member (40) is swingably supported on its one end side by the grab rail (18), and is swingably supported on its opposite side by the carrier member (31). Swinging of the swing member (40) enables the carrier member (31) to move between the front-side position and the rear-side position. When the carrier member (31) is set at the front-side position, the carrier member (31) is supported by the seat (20) of the saddled vehicle (1). Thus, when the carrier member is set at the front-side position, the carrier member is arranged at a lower position, and mass concentration can be achieved. Supporting the carrier member by the seat enables the stable supporting.

According to the second feature, the support portion (21) for supporting the carrier member (31) is provided at the seat (20). Thus, when the carrier member is set at the front-side position, the carrier member can be supported stably.

According to the third feature, the claw member (33) is provided at the lower portion of the carrier member (31), and when the carrier member (31) is set at the front-side position, the claw member (33) engages with the holding portion (24) provided at the seat (20). Thus, when the carrier member is set at the front-side position, the carrier member can be supported stably.

According to the fourth feature, the opening (23) is provided in the seat (20), the claw member (33) is inserted into the opening (23), and the holding portion (24) is provided on a lower side of the opening (23). Thus, the holding portion is prevented from being exposed to an outside, and appearance of the seat can be improved.

According to the fifth feature, the backrest (22) is attachable to the opening Thus, when the carrier member is set at the rear-side position, the backrest is attached to the opening. Thereby, the opening is prevented from being exposed to an outside, and rainwater or the like can be prevented from entering the opening.

According to the sixth feature, the plate-shaped protection member (26) is provided on a lower side of the opening (23). Thus, the protection member can receive rainwater or the like entering through the opening, and can drain the received rainwater or the like to a side of the seat. Thereby, the protection member can protect electrical equipment, luggage, or the like located on a lower side of the seat.

According to the seventh feature, the rear carrier is configured as follows. The rear carrier includes the first lock mechanism (A) that locks swinging motion of the swing member (40) relative to the grab rail (18). The first lock mechanism (A) includes the first fixing member (70) including the first pin (73). The first pin (73) engages with the grab rail (18), thereby locking the swinging motion. The first fixing member (70) is slidably attached to the swing member (40), and is biased toward a locking side by the first elastic member (75). The swinging motion is unlocked when the first fixing member (70) is slid in an axial direction against biasing force of the first elastic member (75). When a knob (71) of the first fixing member (70) is rotated in a state where the first fixing member (70) is slid, an axial-direction position of the first fixing member (70) is held. Thus, the swinging motion of the swing member relative to the grab rail can be locked or unlocked with the simple operation. Further, operation for holding an unlocked state is facilitated.

According to the eighth feature, the rear carrier is configured as follows. The rear carrier includes the second lock mechanism (B) that locks swinging motion of the carrier member (31) relative to the swing member (40). The second lock mechanism (B) includes the second fixing member (60) including the second pin (61). The second pin (61) engages with the carrier member (31) and the swing member (40), thereby locking the swinging motion of the carrier member. The second fixing member (60) is slidably attached to the swing member (40), and is biased toward a locking side by the second elastic member (63). The swinging motion of the carrier member (31) is unlocked when the second fixing member (60) is slid in an axial direction against biasing force of the second elastic member (63). Thus, the swinging motion of the carrier member relative to the swing member can be locked or unlocked with the simple operation. Further, the first lock mechanism has a function of holding the unlocked state. Thus, the second lock mechanism can be operated in a state where unlocking of the first lock mechanism is held. Accordingly, operation for moving the carrier member in a front-rear direction is more facilitated.

4

Figure 2:
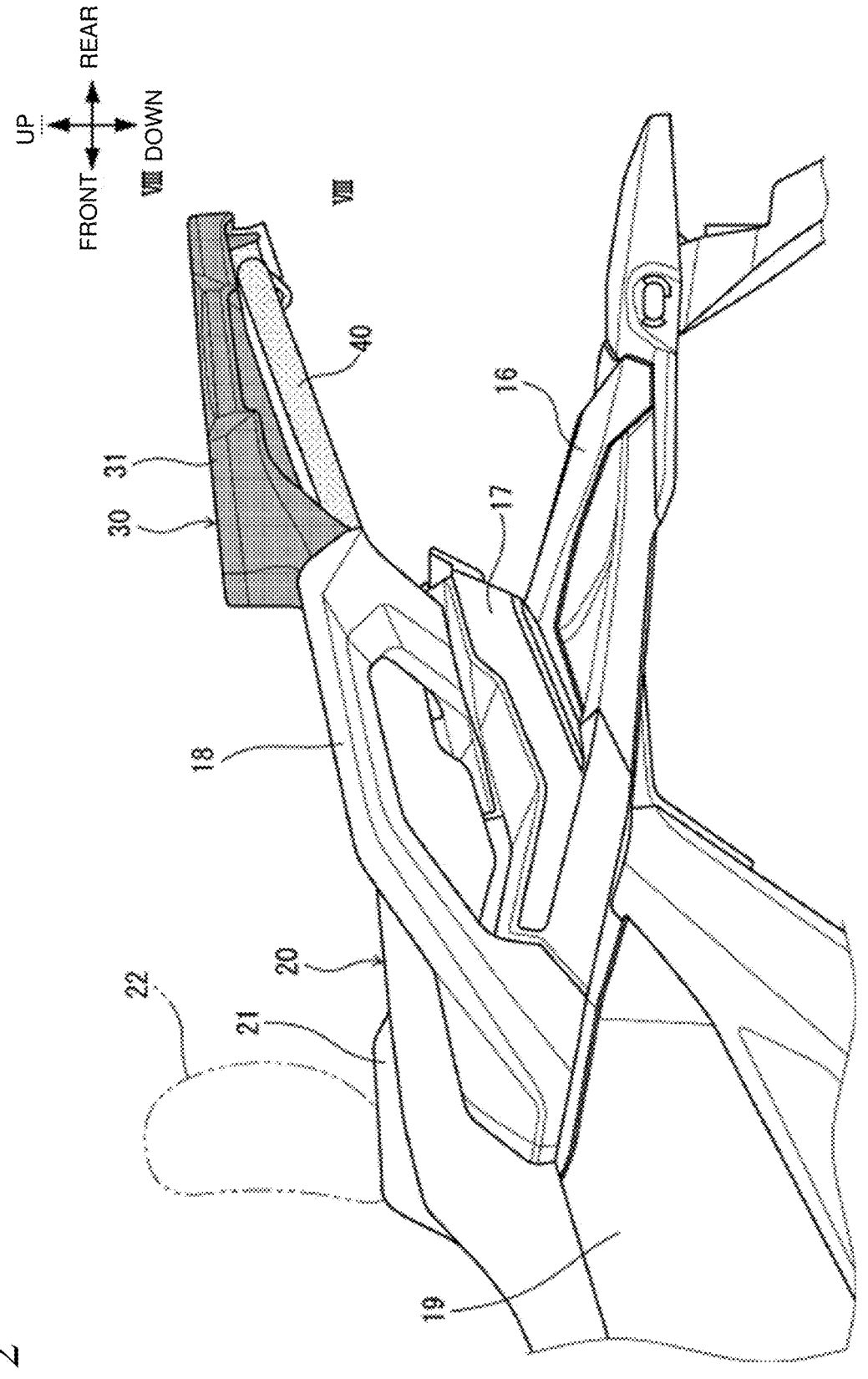
FIG. 2 is a left side view illustrating a surrounding structure of the rear carrier.
Figure 3:
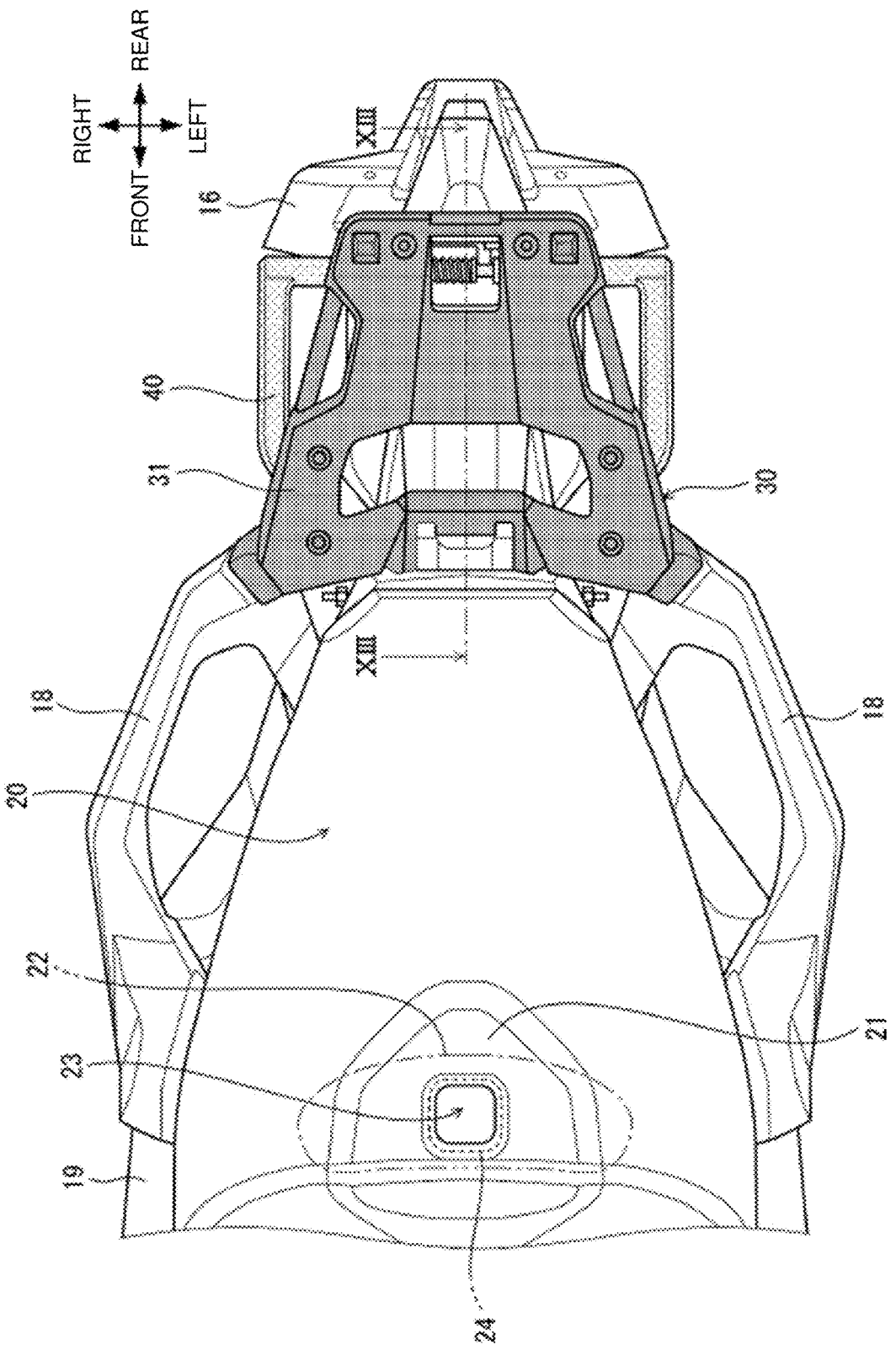
Figure 4:
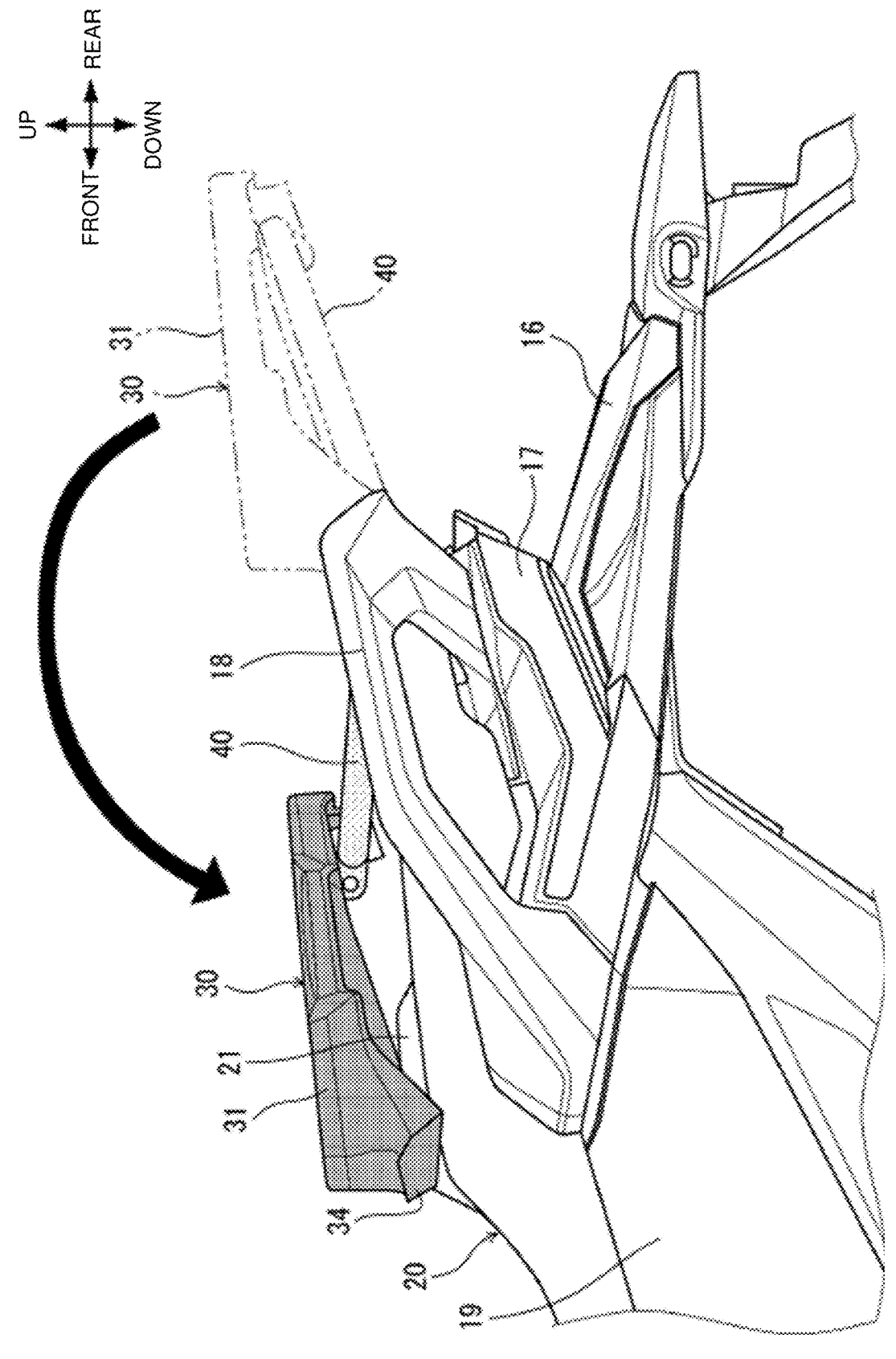
Figure 5:
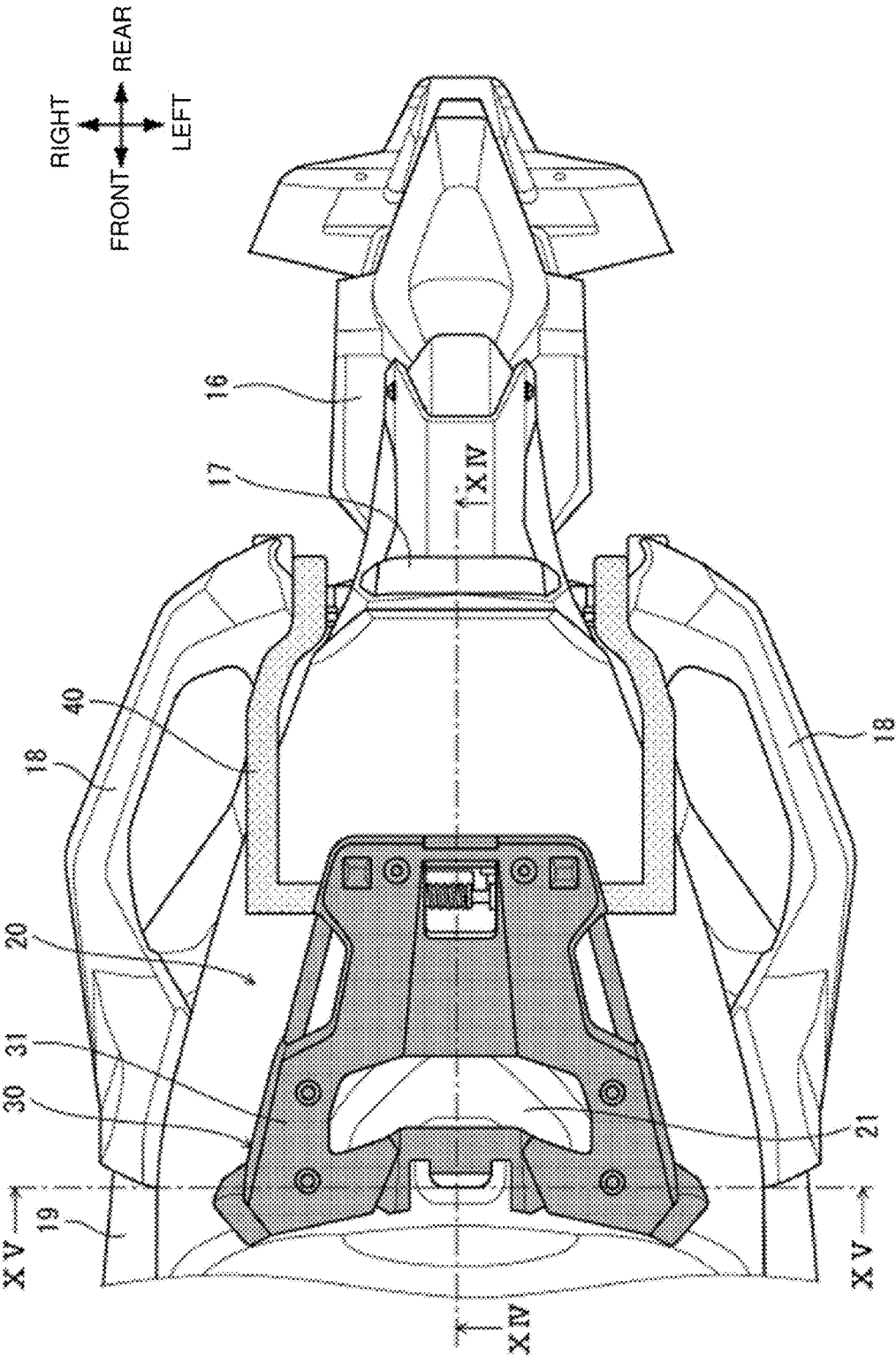
Figure 6:
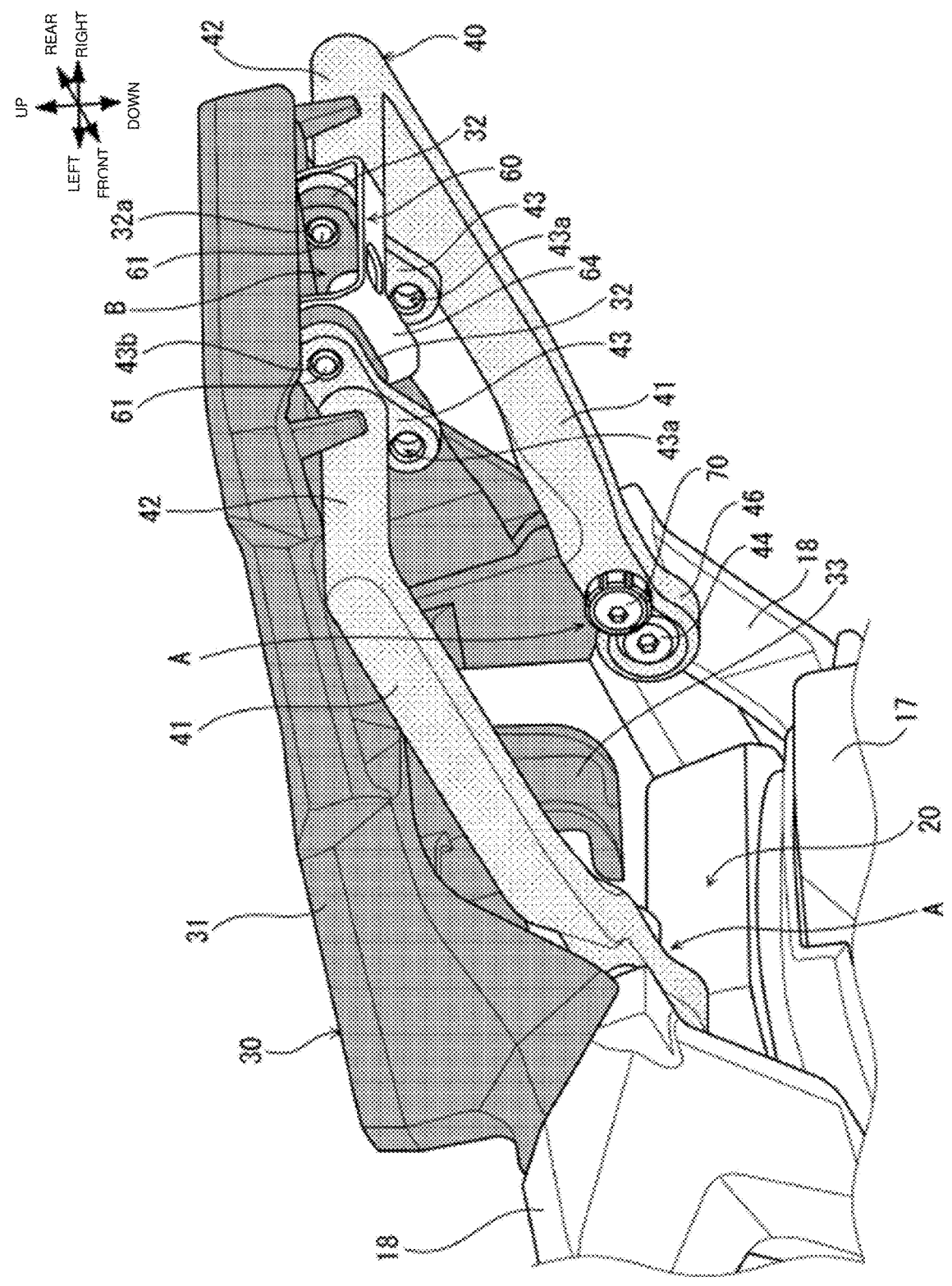
Figure 7:
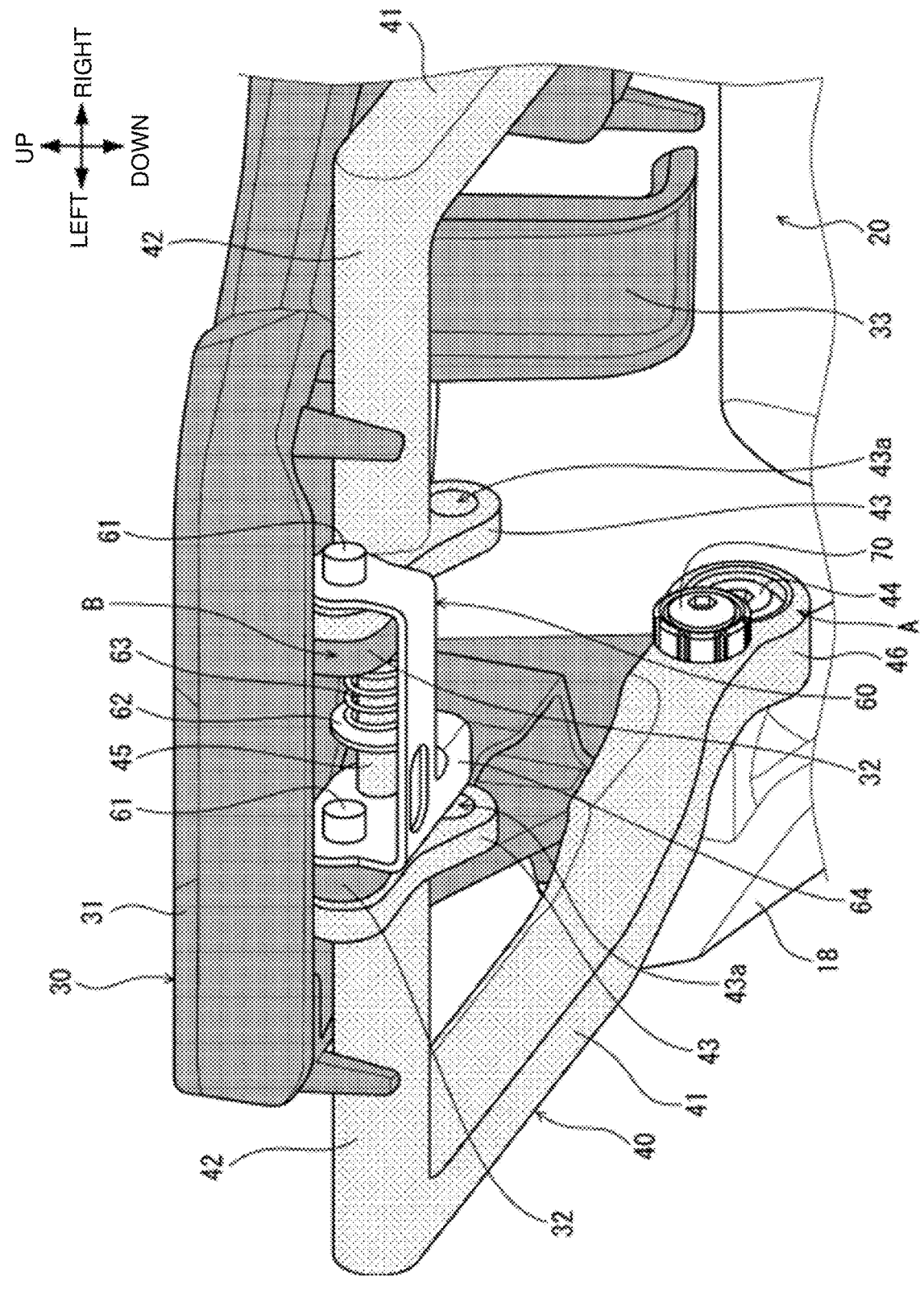
Figure 8:
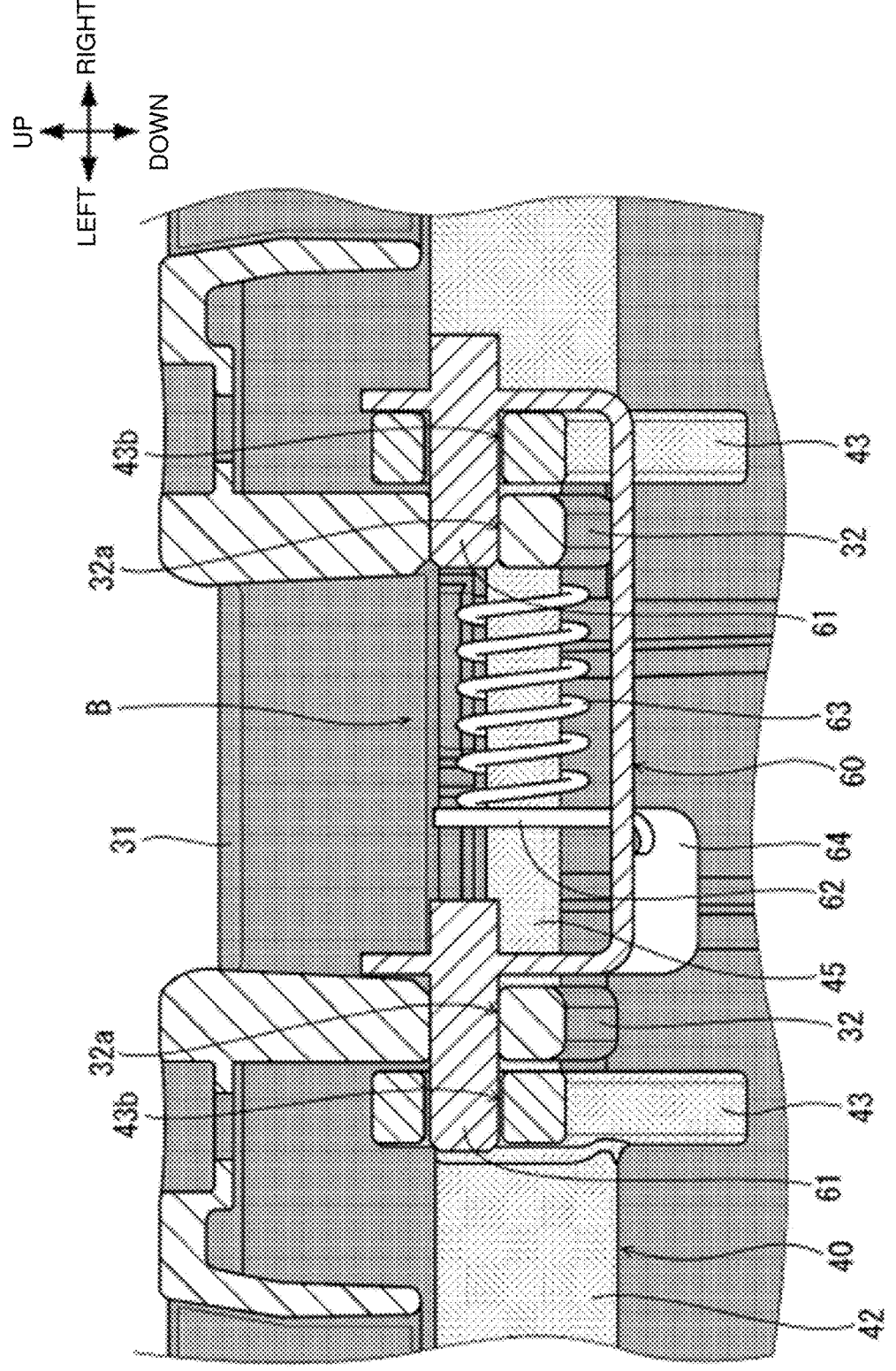
Figure 9:
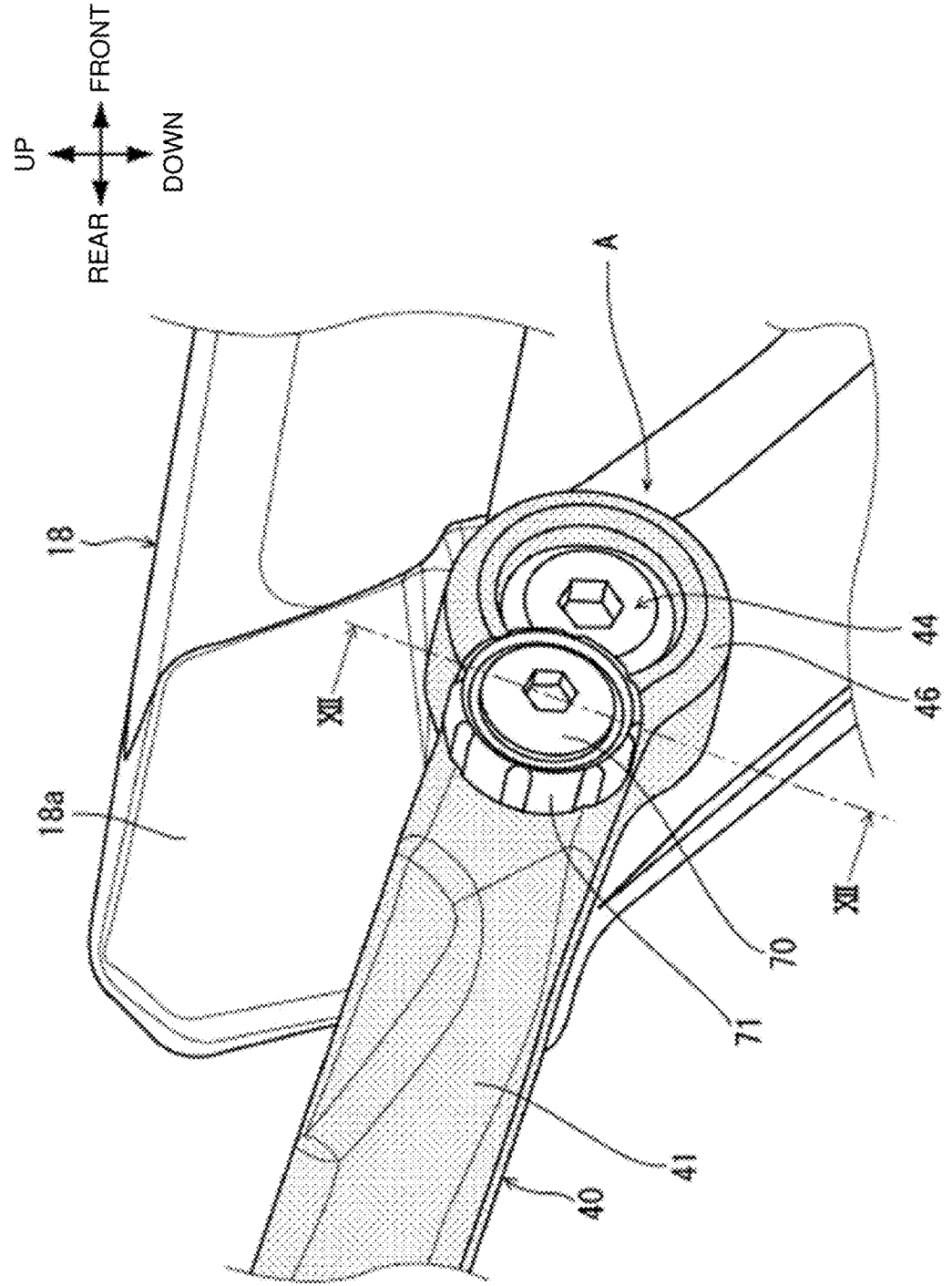
Figure 10:
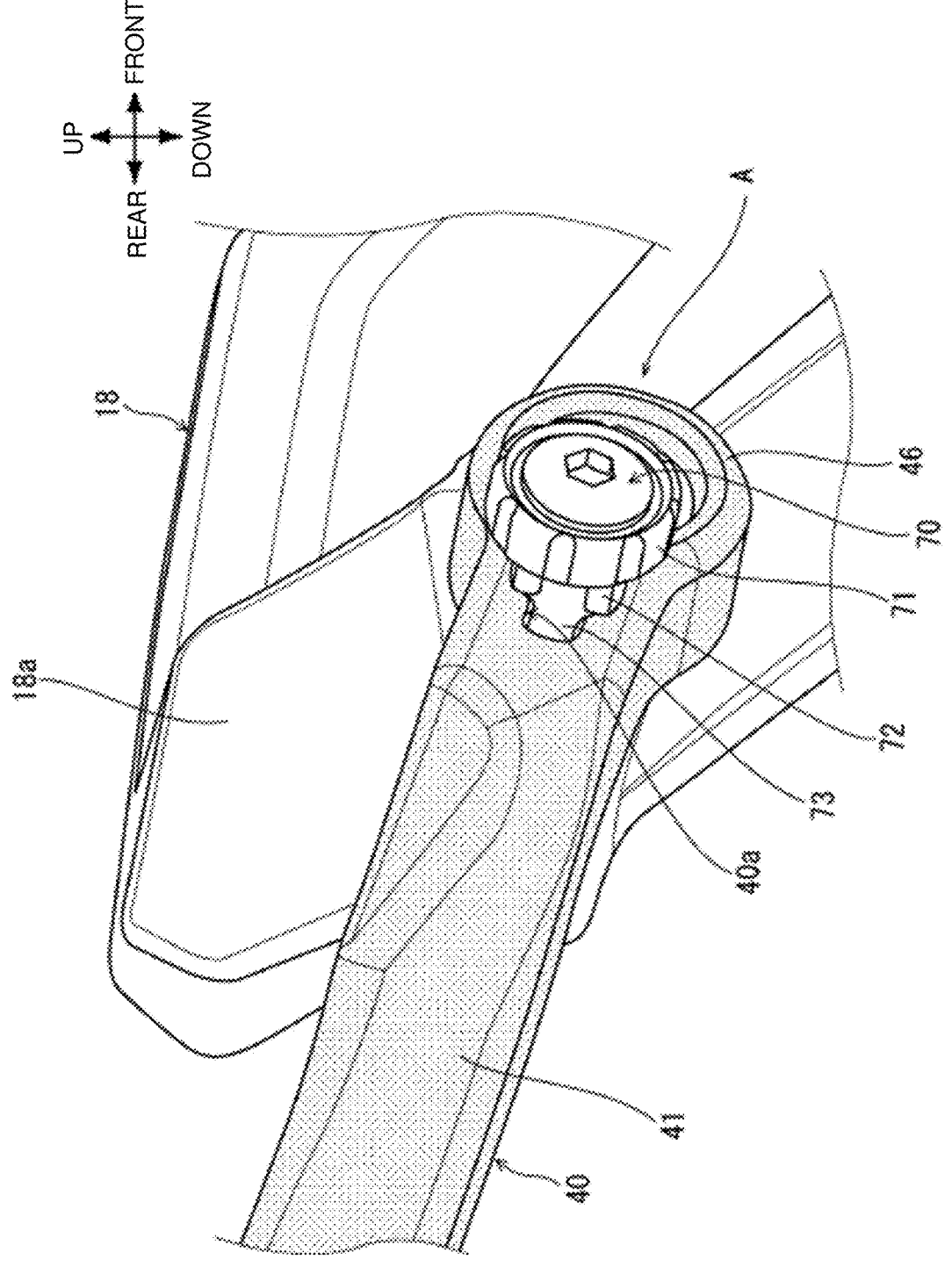
Figure 11:
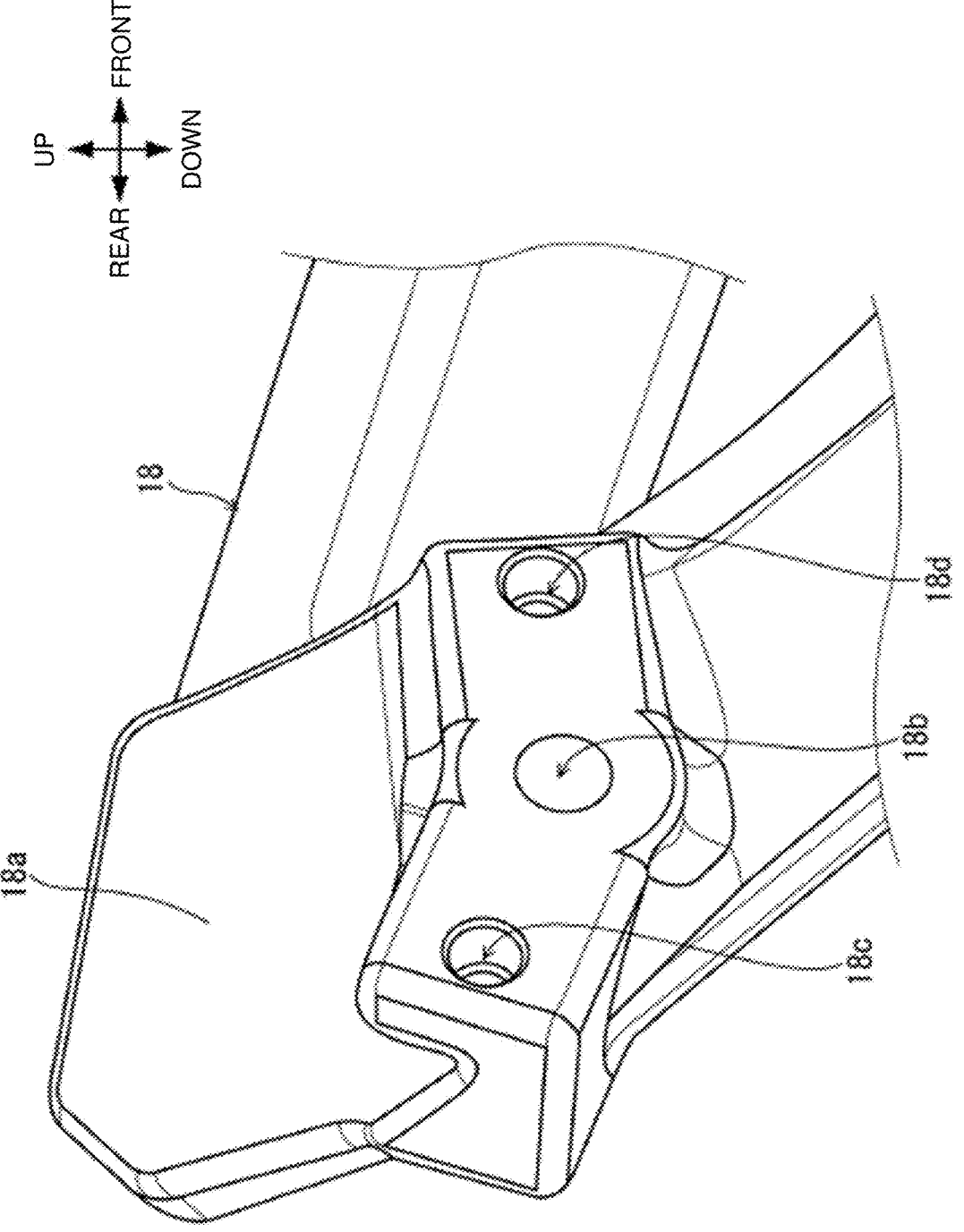
Figure 12:
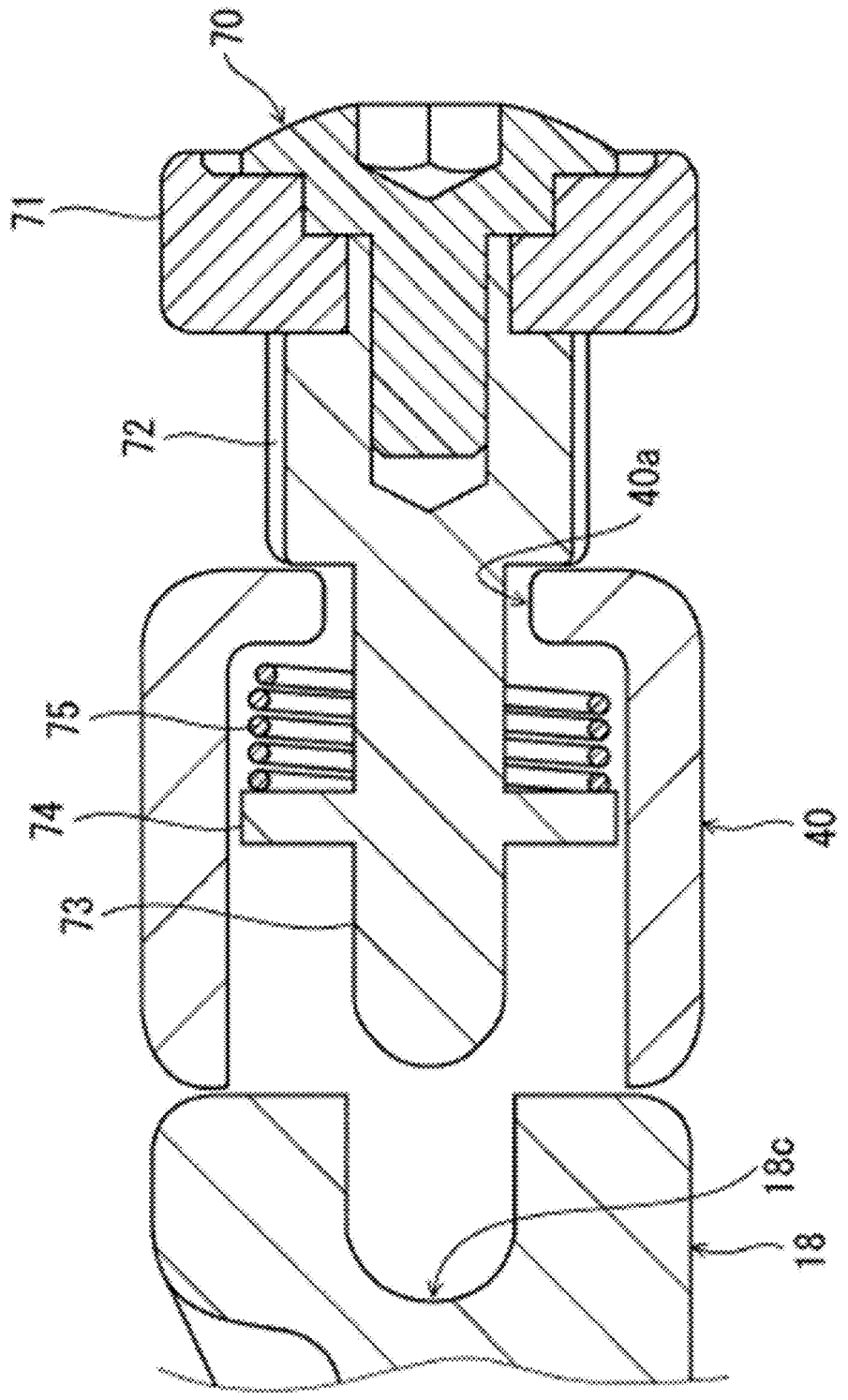
Figure 13:
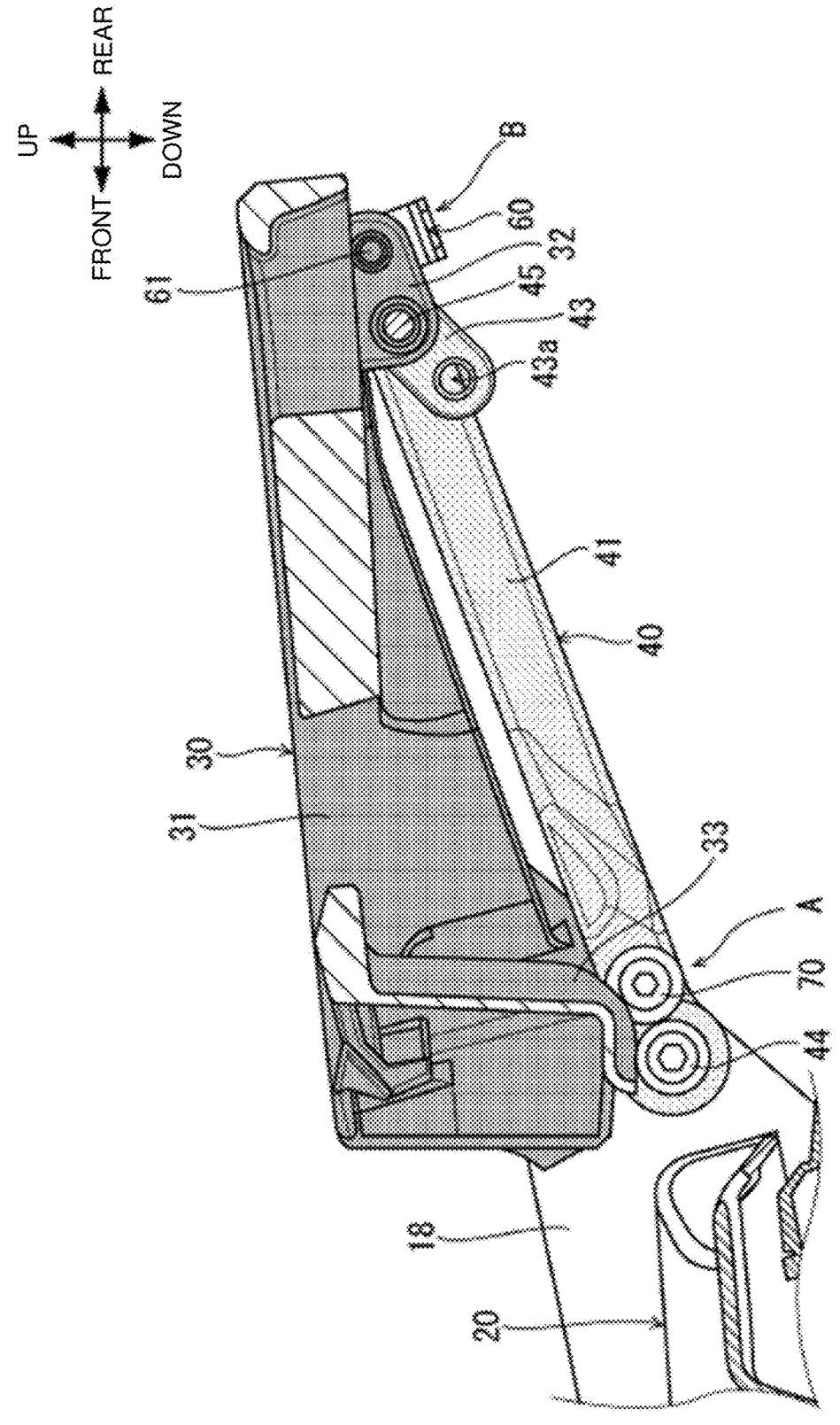
Figure 14:
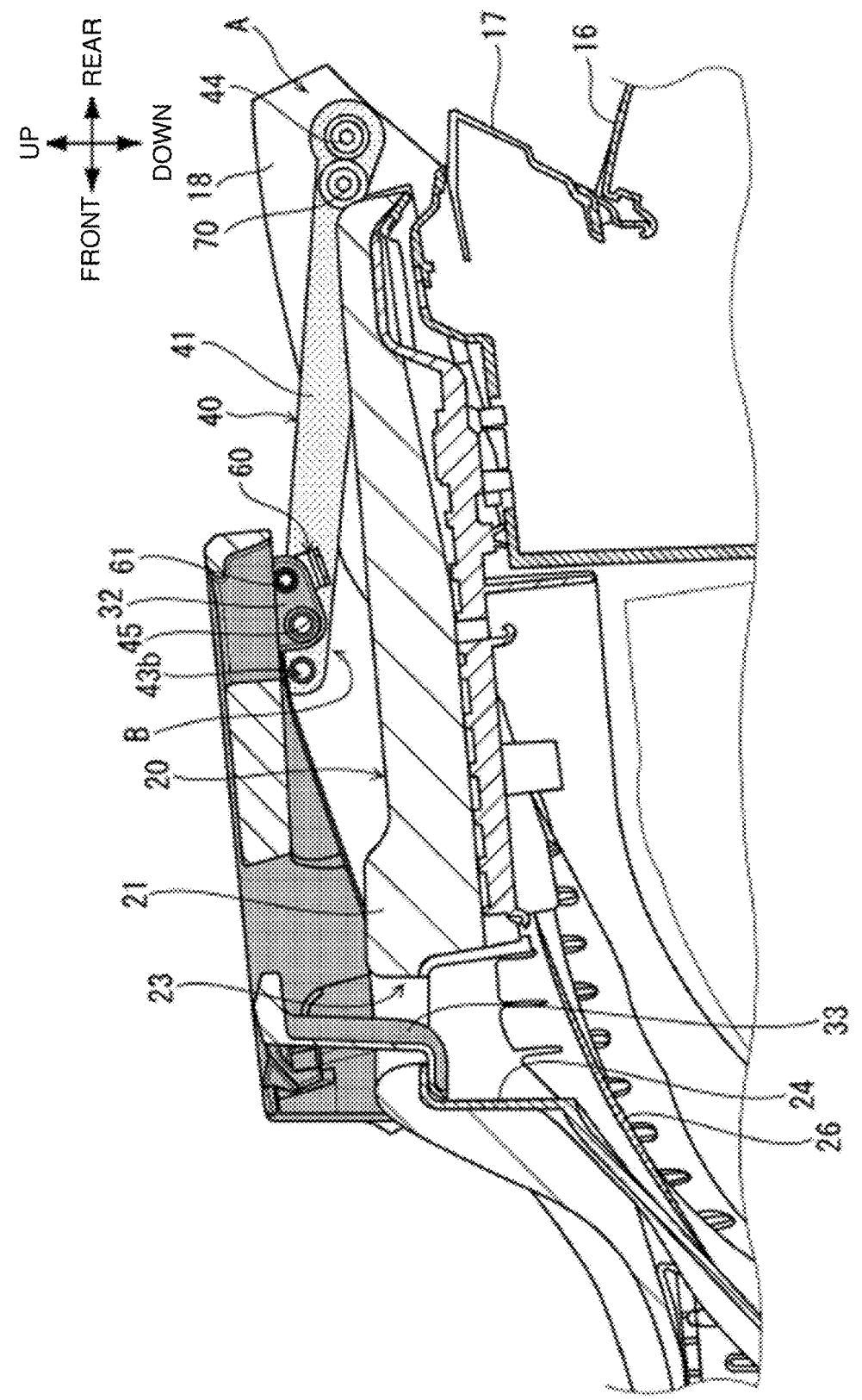
Figure 15:
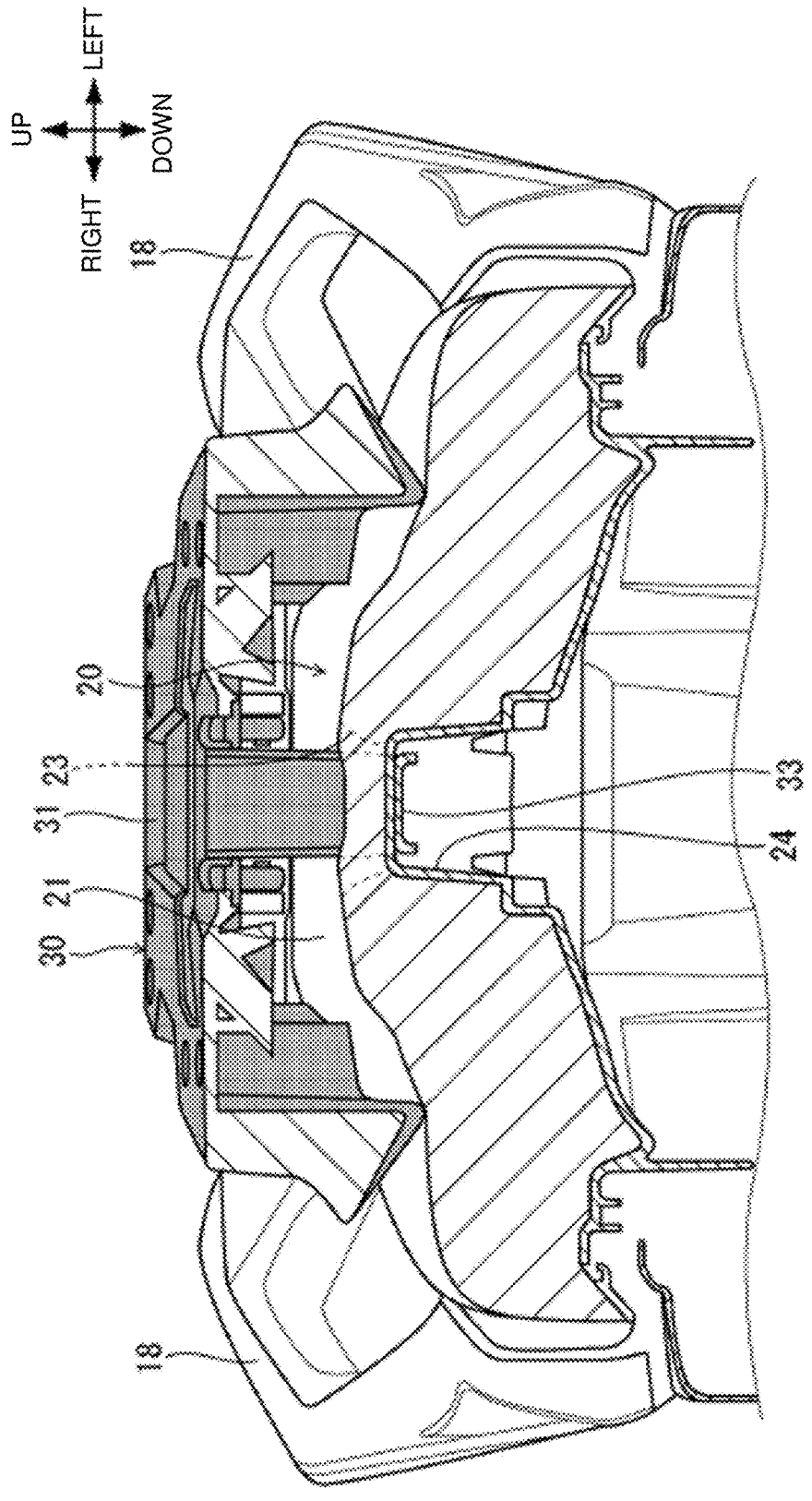
Figure 16:
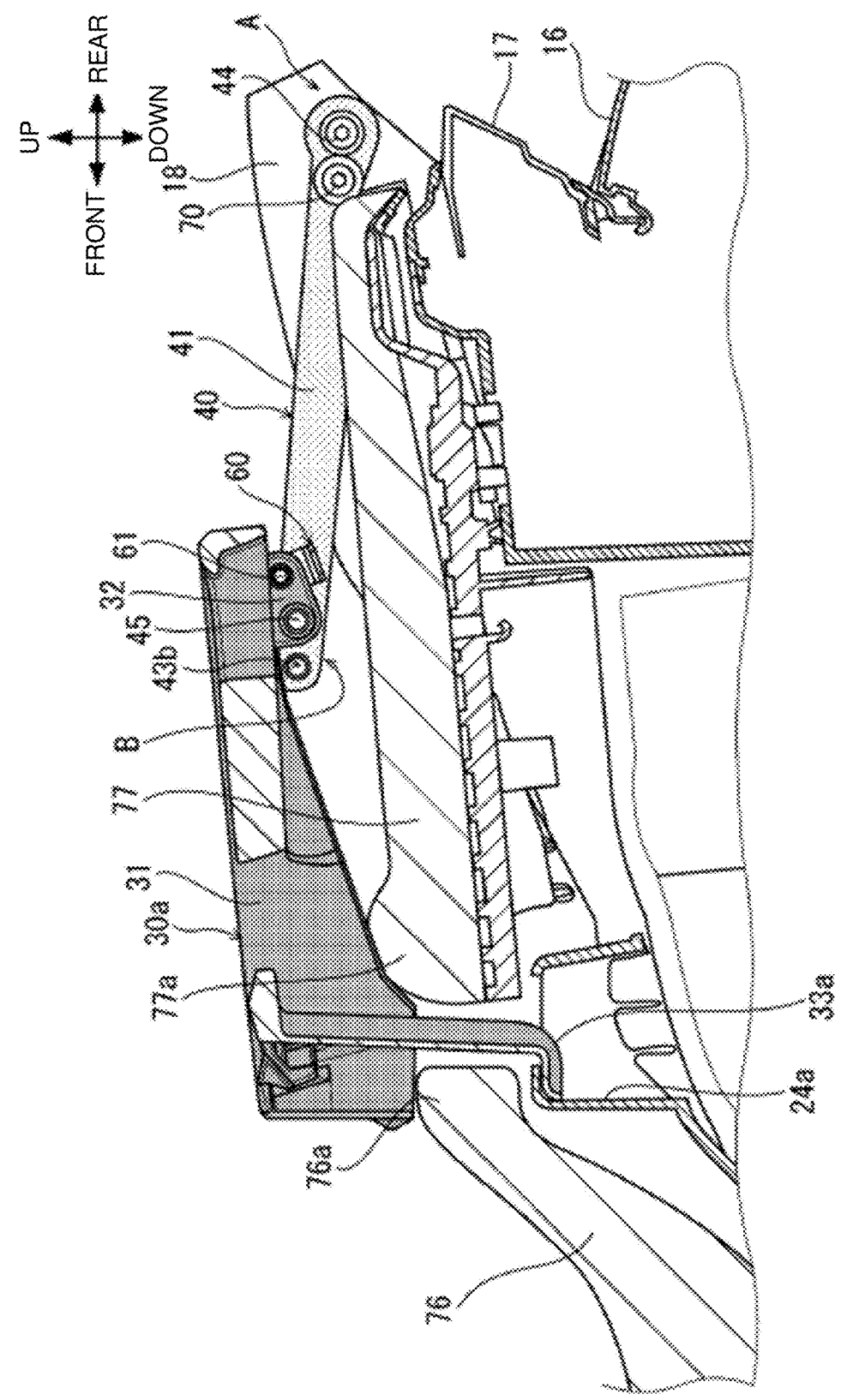

FIG. 3 is a plan view illustrating a surrounding structure of the rear carrier.
FIG. 4 is a left side view illustrating a state where a carrier member is set at a front-side position.
FIG. 5 is a plan view illustrating a state where the carrier member is set at the front-side position.
FIG. 6 is a perspective view of the rear carrier seen from a left rear lower side.
FIG. 7 is a perspective view of the rear carrier seen from a right rear lower side.
FIG. 8 is a sectional view taken along the VIII-VIII line in FIG. 2.
FIG. 9 is a perspective view illustrating a configuration of a first lock mechanism.
FIG. 10 is a perspective view illustrating a state where locking of the first lock mechanism is released.
FIG. 11 is an enlarged perspective view illustrating a shape of a rear end portion of a grab rail.
FIG. 12 is a sectional view taken along the XII-XII line in FIG. 9.
FIG. 13 is a sectional view taken along the XIII-XIII line in FIG. 3.
FIG. 14 is a sectional view taken along the XIV-XIV line in FIG. 5.
FIG. 15 is a sectional view taken along the XV-XV line in FIG. 5.
FIG. 16 is a sectional view illustrating a configuration of a rear carrier according to a modified example of the present embodiment.

DETAILED DESCRIPTION

Figure 1:
FIG. 1 is a left side view of a motorcycle to which a rear carrier according to the present embodiment has been applied.

The following describes a preferred embodiment of the present invention in detail with reference to the drawings. FIG. 1 is a left side view of a motorcycle 1 to which a rear carrier 30 according to the present embodiment has been applied. The motorcycle 1 is a saddled vehicle that travels by transmitting drive force of a power unit P to a rear wheel WR via a drive chain 14. A steering stem (not illustrated) is rotatably supported at a head pipe F1. The head pipe F1 is provided at a front end of a vehicle body frame F. A top bridge 7 is fixed to an upper end of the steering stem. A bottom bridge 10 is fixed to a lower end of the steering stem. The top bridge 7 and the bottom bridge 10 support a pair of left and right front forks 11. The front forks 11 rotatably support a front wheel WF. A front fender 12 is attached to the front forks 11. The front fender 12 covers the front wheel WF from above.

A steering handle 4 for steering the front wheel WF is fixed to an upper end portion of the top bridge 7. A pair of left and right rearview mirrors 5 are attached to the steering handle 4. A front cowl 9 is arranged on a front side of the head pipe F1. The front cowl 9 supports a headlight 8 and a windbreak screen 6.

The vehicle body frame F includes a main frame F2. The main frame F2 extends rearward and downward from the head pipe F1. A pivot frame F3 is coupled to a lower portion of a rear end of the main frame F2. The pivot frame F3 includes a pivot 13. The pivot 13 swingably supports a swing arm 15. The swing arm 15 rotatably supports the rear wheel WR. A rear frame F4 is coupled to rear portions of the main frame F2 and the pivot frame F3. The rear frame F4 supports a seat 20.

The power unit P is suspended at a position on a lower side of the main frame F2 and on a front side of the pivot frame F3. The power unit P includes an engine and a transmission that are configured integrally with each other.

A cover member 3 and an opening-closing cover 2 are arranged at an upper portion of the main frame F2. The cover member 3 covers a luggage box from left and right sides. The seat 20 is arranged on a rear side of the cover member 3. The seat 20 includes a front seat and a rear seat that are formed integrally with each other. A fuel tank is arranged on a lower side of the seat 20. A pair of left and right rear cowls 19 are arranged on a vehicle-width-direction outer side of the rear frame F4. A left and right grab rails 18, a tail lamp device 17, and a rear fender 16 are attached to rear portions of the rear cowls 19. The rear carrier 30 according to the present embodiment is attached to rear portions of the grab rails 18.

FIG. 2 is a left side view illustrating a surrounding structure of the rear carrier 30. FIG. 3 is a plan view illustrating a surrounding structure of the rear carrier 30. The rear carrier 30 includes a carrier member 31 (the gray colored portion in the drawings) for placing luggage thereon. The rear carrier 30 is configured such that a position of the carrier member 31 can be changed in two stages, i.e., changed to either of a front-side position and a rear-side position. FIG. 2 and FIG. 3 illustrate a state where the carrier member 31 is set at the rear-side position.

The rear carrier 30 includes a swing member 40 (the portion hatched with the dots in the drawings) and the carrier member 31. The swing member 40 is swingably supported by the grab rails 18. The carrier member 31 is swingably supported by the swing member 40. The carrier member 31 is arranged so as to be continuous, on an upper side of the rear fender 16, with rear end portions of the grab rails 18 when the carrier member 31 is at the rear-side position.

A support portion 21 is provided at a position on a front side in the rear seat of the seat 20. The support portion 21 has a shape of being swollen upward. An opening 23 is provided at a substantial center of the support portion 21. The opening 23 is used when the carrier member 31 is set at the front-side position. When the carrier member 31 is set at the rear-side position, the opening 23 functions as a hole to which a backrest 22 is attached.

FIG. 4 is a left side view illustrating a state where the carrier member 31 is set at the front-side position. FIG. 5 is a plan view illustrating a state where the carrier member 31 is set at the front-side position. The carrier member 31 is supported by an upper surface of the support portion 21 of the seat 20 in a state where the carrier member 31 is set at the front-side position. Thereby, the carrier member 31 is arranged at a lower position when the carrier member 31 is set at the front-side position. Thus, mass concentration can be achieved. The support portion 21 of the seat 20 supports the carrier member 31. Thereby, the carrier member 31 can be supported stably. Contact surfaces 34 are formed, on vehicle-width-direction outer sides in the carrier member 31, at front-end lower portions of the carrier member 31. The contact surfaces 34 contact against the grab rails 18 when the carrier member 31 is set at the rear-side position.

FIG. 6 is a perspective view of the rear carrier 30 seen from a left rear lower side. FIG. 7 is a perspective view of the rear carrier 30 seen from a right rear lower side. FIG. 8 is a sectional view taken along the VIII-VIII line in FIG. 2. The grab rails 18 swingably support the swing member 40, and the swing member 40 swingably supports the carrier member 31, as described above. A claw member 33 is provided at a lower portion of the carrier member 31. The claw member 33 is inserted into the opening 23 of the seat 20 when the carrier member 31 is set at the front-side position.

The swing member 40 includes a pair of left and right swing arms 41 and coupling rods 42. The coupling rods 42 extend inward in the vehicle width direction from the illustrated rear ends of the left and right swing arms 41. A swing shaft 45 is interposed between the left and right coupling rods 42. The swing shaft 45 swingably supports the carrier member 31. Meanwhile, the swing arms 41 each include an enlarged-diameter portion 46 formed at the illustrated front end thereof. The enlarged-diameter portion 46 is swingably attached to the grab rail 18 by an attachment bolt 44. The attachment bolt 44 serves also as a swing shaft.

The rear carrier 30 according to the present embodiment includes a first lock mechanism A and a second lock mechanism B for holding the carrier member 31 at the front-side position or the rear-side position. The first lock mechanism A prohibits the swing member 40 from swinging relative to the grab rails 18. The first lock mechanism A is configured so as to include a first fixing member 70. The first fixing member 70 is arranged near the attachment bolt 44. The second lock mechanism B prohibits the carrier member 31 from swinging relative to the swing member 40. The second lock mechanism B is configured so as to include a second fixing member 60. The second fixing member 60 is arranged between the left and right coupling rods 42. Each of the first lock mechanism A and the second lock mechanism B is configured so as to include a lock pin. The lock pin slides in the vehicle width direction and engages with a mated member. Hereinafter, a structure of the second lock mechanism B is described first.

The second lock mechanism B includes a second fixing member 60 that supports two second pins 61. The second pins 61 are the lock pins. First holes 43*a* and second holes 43*b* through which the second pins 61 are inserted are formed in a pair of left and right positioning plates 43. The left and right positioning plates 43 are fixed to vehicle-width-direction inner end portions of the coupling rods 42. Meanwhile, third holes 32*a* through which the second pins 61 are inserted are formed in a pair of left and right positioning plates 32. The left and right positioning plates 32 are provided at a rear-end lower portion of the carrier member 31.

The second fixing member 60 is biased leftward in the vehicle width direction by a second elastic member 63. The second elastic member 63 is arranged between a support plate 62 and the positioning plate 32. The second elastic member 63 can be constituted by a coil spring or the like. When the carrier member 31 is locked at the rear-side position, the second pins 61 are inserted through the second holes 43*b* of the positioning plates 43 and the third holes 32*a* of the positioning plates 32. Thereby, the carrier member 31 is prohibited from swinging relative to the swing member 40.

Then, when the second fixing member 60 is slid rightward in the vehicle width direction against biasing force of the second elastic member 63, the second pins 61 are pulled out from the second holes 43*b* and the third holes 32*a*. Thereby, the carrier member 31 is allowed to swing relative to the swing member 40. Meanwhile, when the carrier member 31 is locked at the front-side position, the second pins 61 engage with the first holes 43*a*. According to the above-described second lock mechanism B, the swing motion of the carrier member 31 relative to the swing member 40 can be locked or unlocked with the simple operation.

FIG. 9 is a perspective view illustrating a configuration of the first lock mechanism A. FIG. 10 is a perspective view illustrating a state where locking of the first lock mechanism A is released. FIG. 11 is an enlarged perspective view illustrating a shape of a rear end portion of the grab rail 18. FIG. 12 is a sectional view taken along the XII-XII line in FIG. 9. FIG. 9 to FIG. 12 illustrate the first lock mechanism A on a vehicle-width-direction left side.

The first lock mechanism A includes the first fixing member 70 that supports a first pin 73. The first pin 73 is the lock pin. The first fixing member 70 is provided with a disk-shaped knob 71 to be gripped by fingertips. A contact surface 18*a* is formed at an upper end of a rear portion of the grab rail 18. The contact surface 18*a* contacts against the carrier member 31 when the carrier member 31 is set at the rear-side position. A female threaded hole 18*b* is formed in the grab rail 18 so as to be on a lower side of the contact surface 18*a* as illustrated in FIG. 11. The attachment bolt 44 swingably supporting the swing member 40 is screwed into the female threaded hole 18*b*. A fourth hole 18*c* and a fifth hole 18*d* with which the first pin 73 engages are formed in the grab rail 18 so as to be on front and rear sides of the female threaded hole 18*b*.

Referring to FIG. 12, a pair of the left and right first fixing members 70 are each biased outward in the vehicle width direction by a first elastic member 75. The first elastic member 75 is arranged between a support plate 74 and the swing member 40. The first elastic member 75 can be constituted by a coil spring or the like. When the carrier member 31 is locked at the rear-side position, the first pin 73 engages with the fourth hole 18*c*, thereby preventing the swing member 40 from swinging relative to the grab rail 18.

Then, when the first fixing member 70 is pulled inward in the vehicle width direction against biasing force of the first elastic member 75, the first pin 73 is pulled out from the fourth hole 18*c*. Thereby, the swing member 40 is allowed to swing relative to the grab rail 18. Meanwhile, when the carrier member 31 is locked at the front-side position, the first pin 73 engages with the fifth hole 18*d*.

The first fixing member 70 includes an engagement projection 72. The engagement projection 72 is a part of the first pin 73 in a periphery direction thereof, and projects outward in a radial direction thereof. Meanwhile, the swing member 40 is provided with a through hole 40*a*. The through hole 40*a* has a shape that follows a cross-sectional shape of the first pin 73 at a portion including the engagement projection 72. According to this configuration, rotating the knob 71 in a state where the first fixing member 70 is pulled inward in the vehicle width direction causes the first fixing member 70 to be held at a pulled position. In other words, the first fixing member 70 can be held in an unlocking state. Thereby, the second lock mechanism B can be operated after the unlocking state of the first lock mechanism A is held. Thus, operation of moving the carrier member 31 frontward or rearward is more facilitated.

FIG. 13 is a sectional view taken along the XIII-XIII line in FIG. 3. FIG. 14 is a sectional view taken along the XIV-XIV line in FIG. 5. FIG. 15 is a sectional view taken along the XV-XV line in FIG. 5. The claw member 33 is provided at the lower portion of the carrier member 31 as described above. The claw member 33 is inserted into the opening 23 of the seat 20 when the carrier member 31 is set at the front-side position.

A holding portion 24 is provided on a lower side of the opening 23 of the seat 20. The claw member 33 engages with the holding portion 24. The holding portion 24 enables the carrier member 31 to be supported stably when the carrier member 31 is set at the front-side position. Since the holding portion 24 is provided on a lower side of the opening 23, the holding portion 24 is prevented from being exposed to an outside. Thus, appearance of the seat 20 is improved.

Further, when the carrier member 31 is set at the rear-side position, a backrest 22 (refer to FIG. 2 and FIG. 3) is attached to the opening 23 of the seat 20. Thereby, the opening 23 is prevented from being exposed to an outside, and rainwater or the like is prevented from entering the opening 23.

A plate-shaped protection member 26 is provided on a lower side of the opening 23. Thereby, the protection member 26 can receive rainwater or the like that has entered through the opening 23, and can drain the received rainwater or the like to sides of the seat 20. Thus, the protection member 26 can protect electrical equipment, luggage, or the like located on a lower side of the seat 20.

An upper surface of the support portion 21 of the seat 20 has a shape that follows a shape of a bottom portion of the carrier member 31. Thereby, when the carrier member 31 is set at the front-side position, the carrier member 31 can be supported stably.

FIG. 16 is a sectional view illustrating a configuration of a rear carrier 30*a* according to a modified example of the present embodiment. The same reference signs as those in the above indicate the same or equivalent parts. The present modified example has a feature in that a seat of the motorcycle 1 is divided into a front-side seat 76 and a rear-side seat 77, and an engagement claw 33*a* of the carrier member 31 is inserted into a gap between the front-side seat 76 and the rear-side seat 77 so as to engage with a holding portion 24*a*. A lower portion of the carrier member 31 is supported stably by a support portion 76*a* provided in the front-side seat 76 and a support portion 77*a* provided in the rear-side seat 77. Also in the present modified example, a backrest can be attached by use of the gap between the front-side seat 76 and the rear-side seat 77 when the carrier member 31 is set at the rear-side position.

As described above, the rear carrier 30 according to the present invention includes the swing member 40 supported by the grab rail 18, and the carrier member 31 supported by the swing member 40. The carrier member 31 is movable between the front-side position and the rear-side position by swinging of the swing member 40. When the carrier member 31 is set at the front-side position, the carrier member 31 is supported by the seat 20. Thus, when the carrier member 31 is set at the front-side position, the carrier member 31 is arranged at a lower position so that mass concentration can be achieved.

A form of the motorcycle, a shape and a structure of the grab rails, a shape and a structure of the carrier member, a shape and a structure of the swing member, a shape and a structure of the seat, shapes of the claw member and the support portion, shapes of the opening and the holding portion, configurations of the first lock mechanism and the second lock mechanism, and the like are not limited to those in the above-described embodiment, and can be variously modified. For example, the grab rails, the carrier member, and swing member can be formed of metal, hard resin, or a combination thereof. The swing member may be swingably supported by the vehicle body frame or the like, instead of by the grab rails. The rear carrier according to the present invention is not limited to one applied to a motorcycle, and can be applied to various saddled vehicles such as three-wheeled and four-wheeled vehicles.

REFERENCE SIGNS LIST

1: motorcycle (saddled vehicle), 18: grab rail, 20: seat, 21: support portion, 22: backrest, 23: opening, 24: holding portion, 26: protection member, 30: rear carrier, 31:

carrier member, 33: claw member, 40: swing member, 60: second fixing member, 61: second pin, 63: second elastic member, 70: first fixing member, 71: knob, 73: first pin, 75: first elastic member

What is claimed is:

1. A rear carrier for a saddled vehicle, comprising:

a swing member supported by a grab rail fixed to a rear portion of a vehicle body; and a carrier member supported by the swing member, wherein the swing member is swingably supported on one end side thereof by the grab rail, and is swingably supported on an opposite side thereof by the carrier member, wherein swinging of the swing member enables the carrier member to move between a front-side position and a rear-side position, wherein a claw member is provided at a lower portion of the carrier member, and when the carrier member is set at the front-side position, the claw member engages with a holding portion provided at a seat of the saddled vehicle to support the carrier member.

2. The rear carrier for the saddled vehicle according to claim 1, wherein a support portion for supporting the carrier member is provided at the seat.

3. The rear carrier for the saddled vehicle according to claim 2, further comprising a first lock mechanism that locks swinging motion of the swing member relative to the grab rail, wherein the first lock mechanism includes a first fixing member including a first pin, the first pin engaging with the grab rail, thereby locking the swinging motion, wherein the first fixing member is slidably attached to the swing member, and is biased toward a locking side by a first elastic member, and the swinging motion is unlocked when the first fixing member is slid in an axial direction against biasing force of the first elastic member, and wherein when a knob of the first fixing member is rotated in a state where the first fixing member is slid, an axial-direction position of the first fixing member is held.

4. The rear carrier for the saddled vehicle according to claim 1, comprising a first lock mechanism that locks swinging motion of the swing member relative to the grab rail, wherein the first lock mechanism includes a first fixing member including a first pin, the first pin engaging with the grab rail, thereby locking the swinging motion, wherein the first fixing member is slidably attached to the swing member, and is biased toward a locking side by a first elastic member, and the swinging motion is unlocked when the first fixing member is slid in an axial direction against biasing force of the first elastic member, and wherein when a knob of the first fixing member is rotated in a state where the first fixing member is slid, an axial-direction position of the first fixing member is held.

5. The rear carrier for the saddled vehicle according to claim 4, further comprising a second lock mechanism that locks swinging motion of the carrier member relative to the swing member, wherein the second lock mechanism includes a second fixing member including a second pin, the second pin engaging with the carrier member and the swing member, thereby locking the swinging motion of the carrier member, and wherein the second fixing member is slidably attached to the swing member, and is biased toward a locking side by a second elastic member, and the swinging motion of the carrier member is unlocked when the second fixing member is slid in an axial direction against biasing force of the second elastic member.

6. The rear carrier for the saddle vehicle according to claim 4, wherein the first fixing member includes an engagement projection that projects outward in a radial direction at a part of a circumference of the first fixing member, wherein the swing member includes a through hole having a shape that follows a cross-sectional shape of the engagement projection, and wherein the first fixing member is slidably attached to the through hole, and is biased toward the locking side by the first elastic member, and the swinging motion is unlocked when the first fixing member is slid in the axial direction against biasing force of the first elastic member.

7. The rear carrier for the saddled vehicle according to claim 1, wherein an opening is provided in the seat, the claw member being inserted into the opening, and wherein the holding portion is provided on a lower side of the opening.

8. The rear carrier for the saddled vehicle according to claim 7, wherein a backrest is attachable to the opening.

9. The rear carrier for the saddled vehicle according to claim 8, wherein a plate-shaped protection member is provided on a lower side of the opening.

10. The rear carrier for the saddled vehicle according to claim 8, further comprising a first lock mechanism that locks swinging motion of the swing member relative to the grab rail, wherein the first lock mechanism includes a first fixing member including a first pin, the first pin engaging with the grab rail, thereby locking the swinging motion, wherein the first fixing member is slidably attached to the swing member, and is biased toward a locking side by a first elastic member, and the swinging motion is unlocked when the first fixing member is slid in an axial direction against biasing force of the first elastic member, and wherein when a knob of the first fixing member is rotated in a state where the first fixing member is slid, an axial-direction position of the first fixing member is held.

11. The rear carrier for the saddled vehicle according to claim 7, wherein a plate-shaped protection member is provided on a lower side of the opening.

12. The rear carrier for the saddled vehicle according to claim 11, further comprising a first lock mechanism that locks swinging motion of the swing member relative to the grab rail, wherein the first lock mechanism includes a first fixing member including a first pin, the first pin engaging with the grab rail, thereby locking the swinging motion, wherein the first fixing member is slidably attached to the swing member, and is biased toward a locking side by a first elastic member, and the swinging motion is unlocked when the first fixing member is slid in an axial direction against biasing force of the first elastic member, and wherein when a knob of the first fixing member is rotated in a state where the first fixing member is slid, an axial-direction position of the first fixing member is held.

13. The rear carrier for the saddled vehicle according to claim 7, further comprising a first lock mechanism that locks swinging motion of the swing member relative to the grab rail, wherein the first lock mechanism includes a first fixing member including a first pin, the first pin engaging with the grab rail, thereby locking the swinging motion, wherein the first fixing member is slidably attached to the swing member, and is biased toward a locking side by a first elastic member, and the swinging motion is unlocked when the first fixing member is slid in an axial direction against biasing force of the first elastic member, and wherein when a knob of the first fixing member is rotated in a state where the first fixing member is slid, an axial-direction position of the first fixing member is held.

* * * * *